Nov. 12, 1935.  G. GRINDROD  2,020,309
PROCESS FOR HEAT TREATING FOODS
Filed Feb. 2, 1928  2 Sheets-Sheet 1
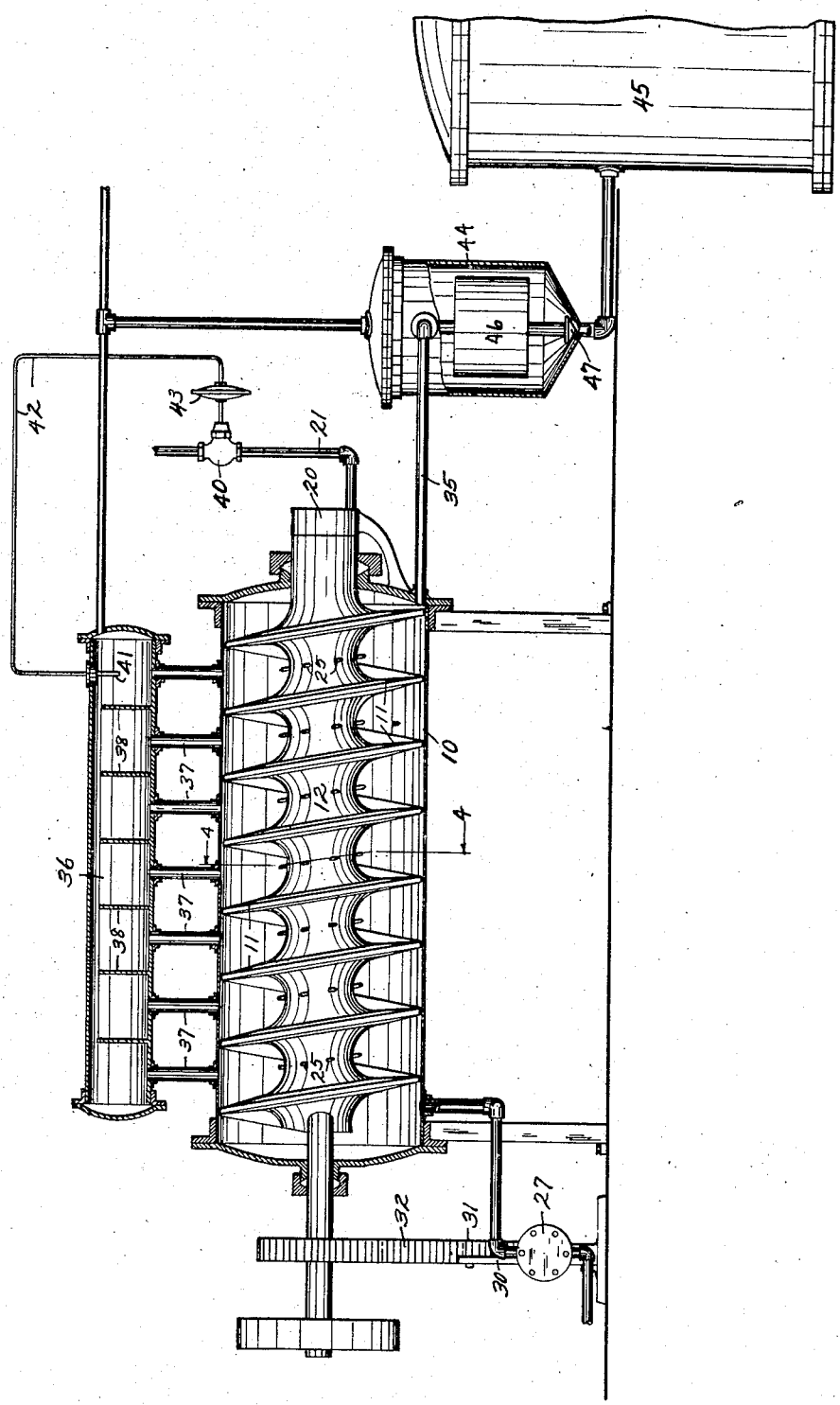
INVENTOR
George Grindrod
BY
Erwin, Wheeler & Woolard
ATTORNEYS

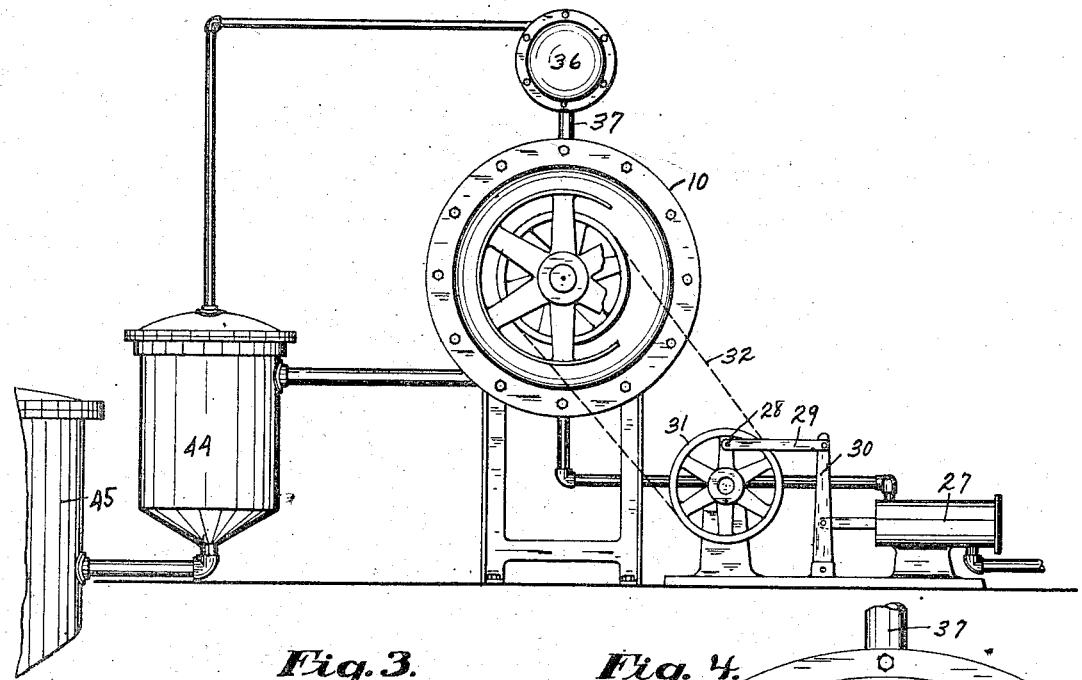
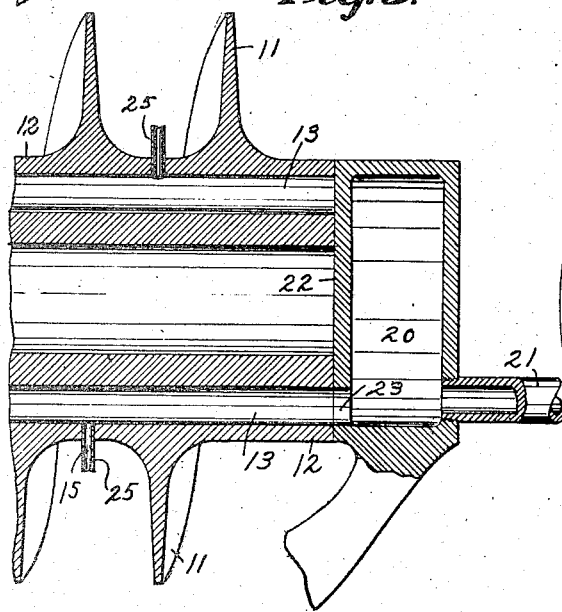
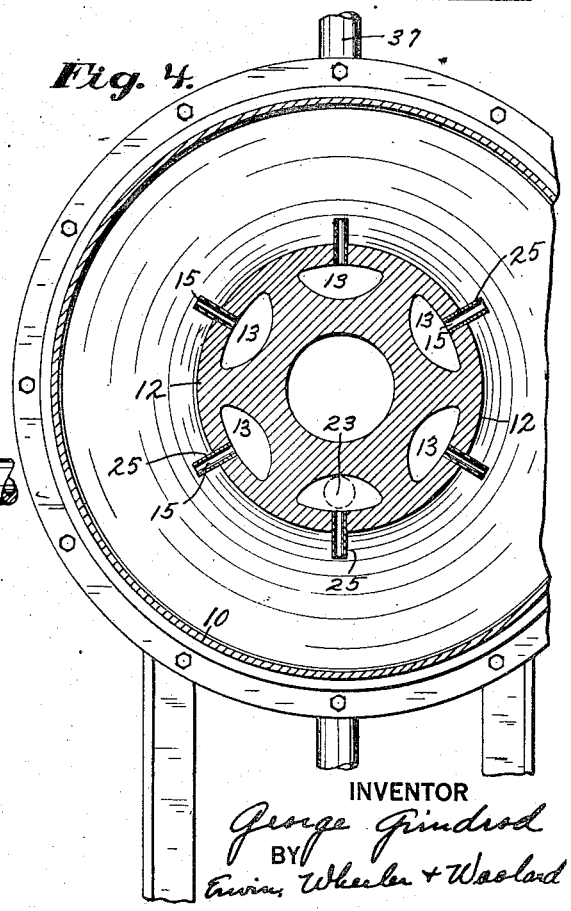

Patented Nov. 12, 1935

2,020,309

UNITED STATES PATENT OFFICE 2,020,309

PROCESS FOR HEAT TREATING FOODS

George Grindrod, Waukesha, Wis., assignor to Grindrod Process Corporation, Waukesha, Wis., a corporation of Wisconsin Application February 2, 1928, Serial No. 251,364

9 Claims. (Cl. 99—15)

My invention relates to process for heat treating foods.

My primary object is to provide means for completely sterilizing foods, particularly liquid and semi-liquid foods such as milk and cream, without affecting the flavor.

More particularly stated, my object is to provide a process of thermal sterilization which can be carried on continuously and rapidly with a large total output for a given period of time as compared with sterilizing processes as heretofore practiced; to provide a process, facilitated by suitable apparatus, in which a continuously flowing stream of material may be sub-divided and each sub-division heat treated in the same manner and to exactly the same extent as every other sub-division, whereby precise results can be obtained; to provide a process which may be interchangeably used for either pre-warming or sterilizing purposes; to provide for successively subjecting segregated portions of a moving stream of food to permeating jets of steam moving sweepingly through the segregated portions of the food in a manner to reach all portions thereof with like effect and to repeat the operation indefinitely as to any desired number of such segregated portions; to provide means whereby the product so treated may be delivered into containers, the heat treatment being instantly arrested and the temperature of the food simultaneously reduced to a point where change in the characteristics or flavor of the food will not occur; to provide for completing the treatment as to any given portion of the food with such expedition that changes in the character or flavor of the food will not occur during the heat treatment; and to provide simple and reliable means to facilitate carrying on the process and insure accurate and uniform results.

In the drawings:—

Figure 1 is an elevational sectional view of a preferred form of apparatus which I have designed for the purposes of my invention and embodying its mechanical features.

Figure 2 is an end elevation.

Figure 3 is a detail view, enlarged, showing a fragment of the rotary feeder and distributor in its relation to the steam chest from which the distributing steam passages are fed;

Figure 4 is a cross section drawn to line 4—4 of Figure 1.

Like parts are identified by the same reference characters through the several views.

In a former Patent No. 1,714,597, dated May 28, 1929, I have disclosed a method of sterilizing milk by what may be termed the kettle or batch method. By that method, the milk is sterilized by injecting into it from beneath, quantities of steam in a manner to heat the milk to a temperature of about two hundred and thirty degrees F., maintain that temperature from two to three minutes, and then reduce the temperature almost instantly to prevent thermo-chemical change.

But the method and apparatus disclosed in said Patent No. 1,714,597 are subject to certain economic disadvantages incident to batch processes in general when large quantities of material require to be expeditiously treated and in cases where the source of supply is substantially continuous. Under such circumstances, the batch process involves loss of time, loss of heat and other disadvantages incident to intermittent operation, whereas under other conditions the batch process may be preferred.

The process herein disclosed is designed to provide for a continuous process for sterilization of liquiform materials, substantially uniform in heat and time as to all portions of the material and yet of such short duration as to avoid thermo-chemical change in the food as effectually as is done under the process described in said former patent. In my former process, the heat applied is much less than of that required to produce thermal sterilization by ordinary methods previously employed.

In the practice of the process herein described I pass a continuously flowing stream of material through a treating zone in which the material is subdivided into small portions and segregated or sufficiently isolated from other portions in the treating zone to prevent contamination of the more advanced material from the portions of material in the earlier stages of treatment, each portion in an advanced stage being also isolated and protected from unsterile material entering the zone by the interposition of materials undergoing treatment in the less advanced stages. My invention also contemplates maintenance of balanced pressures upon the various portions in said zone whereby there will be no tendency to force material from one subdivision into another.

During the passage of the material through said treating zone, I separately subject each subdivided portion to the action of jets of steam which are delivered into the material below the surface thereof, preferably at constantly changing angles and from constantly changing points of delivery. These jets may be made to sweep through the material from one side of the general line of travel to the other side and by injecting the steam at a high pressure at the point of emergence from a traveling nozzle, the jets are caused to move with a sweeping action across the particles of material with which they contact, and underneath the surface of the segregated portion. When the material is to be sterilized, the steam may thus enter the material at a predetermined high pressure and a correspondingly high sterilizing temperature, and by employing a series of steam injecting nozzles along the line of travel each subdivided portion may be subjected successively to such jets of steam in successive stages of its advancement whereby each such portion may be continuously followed by other portions in different stages of advancement with a resultant continuous delivery of the product.

In this manner each of the small subdivided portions may be made equal in quantity to all other subdivided portions and equally subjected to the action of equal quantities of steam having the same pressure and temperature and sweeping in the same manner through each portion of the material whereby the particles of material will have substantially uniform exposure to the particles of steam in each of the subdivisions.

My new process will now be more fully explained in connection with a description of the apparatus and its use.

Milk, or other material to be treated, will be fed from a source of supply into a cylinder or cylindrically curved trough 10, which is disposed horizontally, or nearly so, and which contains a screw conveyor 11 having a helical blade, the outer margin of which substantially fits the concave interior surface of the cylinder or trough below a horizontal plane through the conveyor axis, and may substantially fit the cylinder wall throughout its area as shown in the drawings. This conveyor 11 has a large shaft 12, which is provided with an annular series of longitudinally extending steam passages 13, (Fig. 4). Each steam passage 13 has ports 15 leading respectively through the wall of the shaft to the spaces between successive turns of the helical blade of the conveyor so that when the cylinder 10 is filled approximately half full of milk or other material to be treated, steam may be injected into each portion of milk between successive turns of the blade. When the cylinder is filled to a level at which its surface is intersected by the drum or shaft 12, each such portion of the material will be effectually partitioned from the other portions and it may therefore be separately and independently subjected to the action of the associated steam jet or jets.

In this way the atmosphere above the segregated portions of material is also subdivided into segregated portions in the same way that the liquid is divided. Thus communication is prevented between any portions of the liquid separated by two or more turns of the helix of the shaft such as might otherwise occur through the medium of the atmosphere above the liquid. With successive portions of the advancing stream thus segregated it will be obvious that the portions nearest to the outlet will be separated from the infeeding material, not only by the mechanical means provided by the conveyor flight but by the following segregated portions of material undergoing earlier stages of steam treatment. Therefore while in each successive space the jets of steam will agitate the material, the desired degree of isolation can nevertheless be maintained in such a manner as to insure delivery of a sterile product where sterility is desired and uniformity in the quality of the product even in cases where the process is not being employed for sterilizing purposes.

Steam is delivered to the passages 13 from a steam chest 20 which receives it from a supply pipe 21. The end 22 of the shaft 12 is machined and fitted to the wall of the chest 20 on the inner side and the passages 13 are successively brought into registry with a port 23 in said wall to receive steam from the chest while being carried past this port by the rotation of the conveyor. The port 23 is located below the shaft axis, and preferably registers only with the lowermost passage. But its size and the form of the passage opening are such that steam will be supplied to the passage throughout the major portion of the period during which the associated ports are moving through the material as the conveyor rotates. But steam will be delivered only into passages which are in a position to deliver steam directly into the material through their ports 15. The ports or outlets are, of course, submerged in the material before the steam jets are projected therefrom and, therefore, the steam does not merely blow against the surface of the material and form cavities therein, but on the contrary, travels at high velocity through portions of the material underneath its surface with resultant violent agitation. Preferably, each port 15 is provided with a projecting nozzle 25 to deliver the steam more effectively and to a greater depth into the material than would be the case if mere ports or apertures were used.

A positive feed mechanically driven pump 27 is employed to deliver the material into the cylinder 10. This pump is actuated from the crank 28 through the link rod 29 and the lever 30. The crank wheel carries a sprocket pulley 31 which drives the conveyor through a chain 32. The pump and its actuating mechanism are so constructed as to size and speed of operation that the material will be delivered to the cylinder 10 at a rate calculated to maintain the supply in the cylinder at a level above the bottom of the shaft 12 and below the top thereof, whereby each successive portion or unit of material will be separately conveyed by the screw, given separate heat or steam treatment and discharged through an outlet duct 35 without intermingling with other portions while in the cylinder. As the screw conveyor rotates, each portion moves toward the discharge end and receives sweeping jets of steam from the nozzles as they successively come into action. The transversely swinging movements of the nozzles are across the path along which the material travels and all particles of the material are therefore very effectively reached. The nozzles follow the helical line of the screw in their arrangement and therefore each successive nozzle operating upon any given portion of the liquid enters it a little farther toward the outlet than its predecessor, although in the same relative position with reference to the center of the body of material, the latter having correspondingly moved toward the outlet.

The action of the steam upon the material causes a violent ebullition of the latter, and in order that the steam may continuously escape, I employ an expansion chamber 36, preferably superposed on or above the cylinder 10 and connected at intervals by the vertical pipes 37. Baffles 38 are placed in the expansion chamber, which also serves as a separator for any milk (material) that may be carried from the splashing liquid into this chamber 36. The separated material falls back usually into the next unit. The steam supply to the cylinder 10 is regulated by a valve 40 which is controlled automatically by a heat regulating or pressure bulb 41 in the expansion chamber, this bulb being connected by a pipe 42 with a diaphragm chamber 43, the diaphragm of which is connected with the valve stem in a well known manner.

The rate of steam feed and the size and number of the nozzles 25 will be so proportioned to the quantity of material handled and so calculated with reference to the temperature of the steam that each portion of material treated will be sterilized in the shortest possible interval of time, consistent with thorough sterilization, and the material will then be instantly cooled by discharging it into a container 44 which may be connected with a suitable condenser 45. The container 44 may have its outlet controlled by a float 46 and float controlled valve 47 so that the material may be delivered into a receiver under vacuum without allowing steam to blow through the outlet.

When the apparatus is used for pre-warming milk or other material, its operation will be the same except that steam of a lower temperature may be used, or the material fed through the apparatus at a more rapid rate. But with steam at 100 pounds pressure and corresponding temperature, only a few seconds will be required to effect a complete sterilization. With steam at the pressure and temperature above mentioned, thirty seconds should be ample, although the time interval required will also vary in proportion to the volume of material in each segregated portion or unit and the quantity of steam delivered thereto.

According to the process herein described, the material is substantially instantaneously raised to the desired temperature, maintained at said temperature momentarily and then all thermo-chemical change is arrested by the chilling that results by release of pressure and the resulting vaporization. When sterilizing the material, the temperature must be such as to accomplish that purpose with such momentary exposure.

I claim:

1. The process of heat treating foods consisting in subdividing the food and the atmosphere above it into segregated measured portions, each protected from contamination by other portions, moving said portions separately through a heating zone and subjecting each portion continuously to the direct action of jets of steam underneath the surface thereof while constantly changing the position and direction of said jets with reference to the material.

2. The process of heat treating liquid and semi-liquid materials consisting in subdividing the material and the atmosphere above it into segregated portions and injecting jets of steam into each body of segregated materials underneath the surface thereof at constantly changing angles and at high velocity until such portion has been sterilized to the desired degree, and then delivering the segregated portions into a vacuum chamber upon completion of their heat treatment to immediately reduce the temperature below that promotive of chemical or flavor change.

3. The process of heat treating liquid and semi-liquid materials to sterilize the same, consisting in subdividing a continuously flowing stream of such material and the atmosphere associated with the subdivided portions to completely segregate the same from other portions and their respective atmospheres, separately and independently raising the temperature of each segregated portion at a rate and to a degree sufficient to accomplish thermal devitalization of the living cells therein within a period of time less than that required for material flavor change and then immediately reducing the temperature of the segregated portions sufficiently to arrest thermo-chemical change.

4. The process of heat treating liqui-form foods which consists in advancing the material as a flowing stream, subdividing and isolating successive portions of such stream from other portions, and separately subjecting each of the advancing portions to the action of steam jets delivered within the material in a manner to bring the particles successively into contact with the steam by circulation and agitation.

5. The process of heat treating a flowing stream of liquiform food material consisting in separating portions of the flowing stream from preceding and following portions, isolating each separated portion and its associated atmosphere from other portions and from their associated atmospheres, injecting high velocity steam jets into the isolated portions below the surface of the material while such portions are being advanced in conformity with the rate at which the stream is flowing and while associated portions are receiving similar steam injections in different stages, said steam jets being of such temperature and velocity as to complete the heat treatment and sterilize the material within two to three minutes.

6. The process of heat treating a flowing stream of liquiform food material which consists in separating portions of said stream from preceding and following portions and injecting jets of steam into each separated portion, shifting the direction of the jets within the portions which receive them and isolating each such portion from other portions and their associated atmospheres and from the surrounding atmosphere.

7. The process of heat treating liquiform foods consisting in subdividing the material, passing the subdivided portions successively through a heating zone, delivering into such portions at successive stages of their advance jets of steam of predetermined pressure, volume and velocity, and progressively shifting said jets in position and direction within the material to expedite contacting the particles thereof with particles of steam at high temperature.

8. The continuous process of sterilizing liqui-form material, which consists in continuously feeding said material through a treating zone, subdividing the material into segregated units of predetermined substantially equal volume as it enters the treating zone, introducing jets of steam at high velocity and of a sterilizing temperature into the material of each unit at successive stages of its passage through the treating zone to raise the material to a sterilizing temperature and subject it to the kinetic energy of the steam jets to sterilize the same in approximately less than three minutes.

9. The process of sterilizing liquiform material which consists in continuously feeding such material through a treating zone in regulated portions, successively partitioning such portions from following portions within said zone and subjecting each such portion at successive stages of its advancement through said zone to jets of steam injected below its surface at a sterilizing temperature and high velocity while protecting the more advanced portions from contamination by interposition of portions less advanced between the more advanced portions and the infeeding material and associated atmosphere.

GEORGE GRINDROD.